Oct. 7, 1958 W. C. VAN CLIEF, JR 2,854,797
APPARATUS FOR SANDING THE TIPS OF BRUSH BRISTLES
Filed May 13, 1955 6 Sheets-Sheet 1

INVENTOR.
WILLIAM C. VAN CLIEF JR.
BY
Oscar L. Spencer
ATTORNEY

INVENTOR.
WILLIAM C. VAN CLIEF JR.
BY
Oscar L Spencer
ATTORNEY

Oct. 7, 1958 W. C. VAN CLIEF, JR 2,854,797
APPARATUS FOR SANDING THE TIPS OF BRUSH BRISTLES
Filed May 13, 1955 6 Sheets-Sheet 3
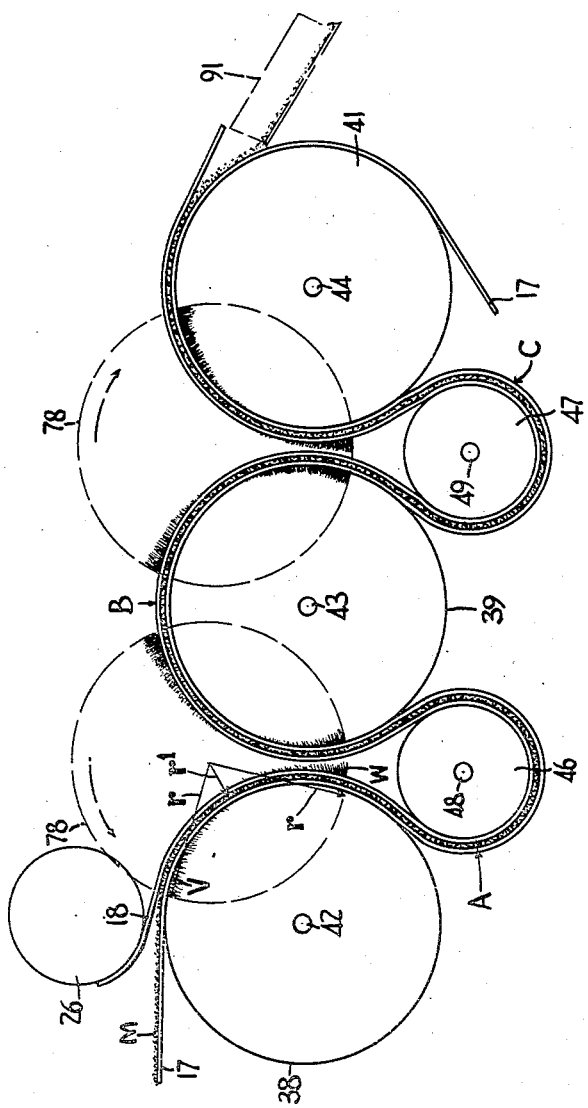
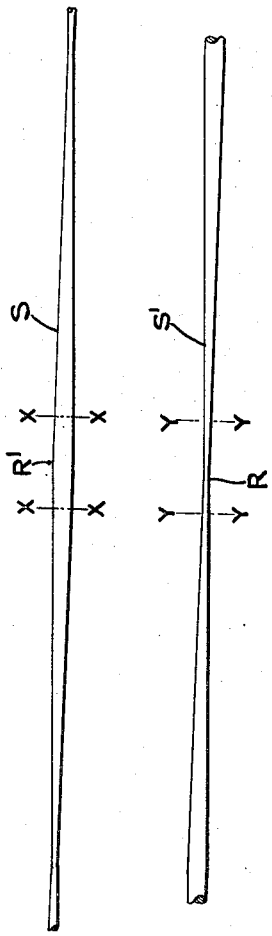
INVENTOR.
WILLIAM C. VAN CLIEF JR
BY
Oscar L. Spencer
ATTORNEY

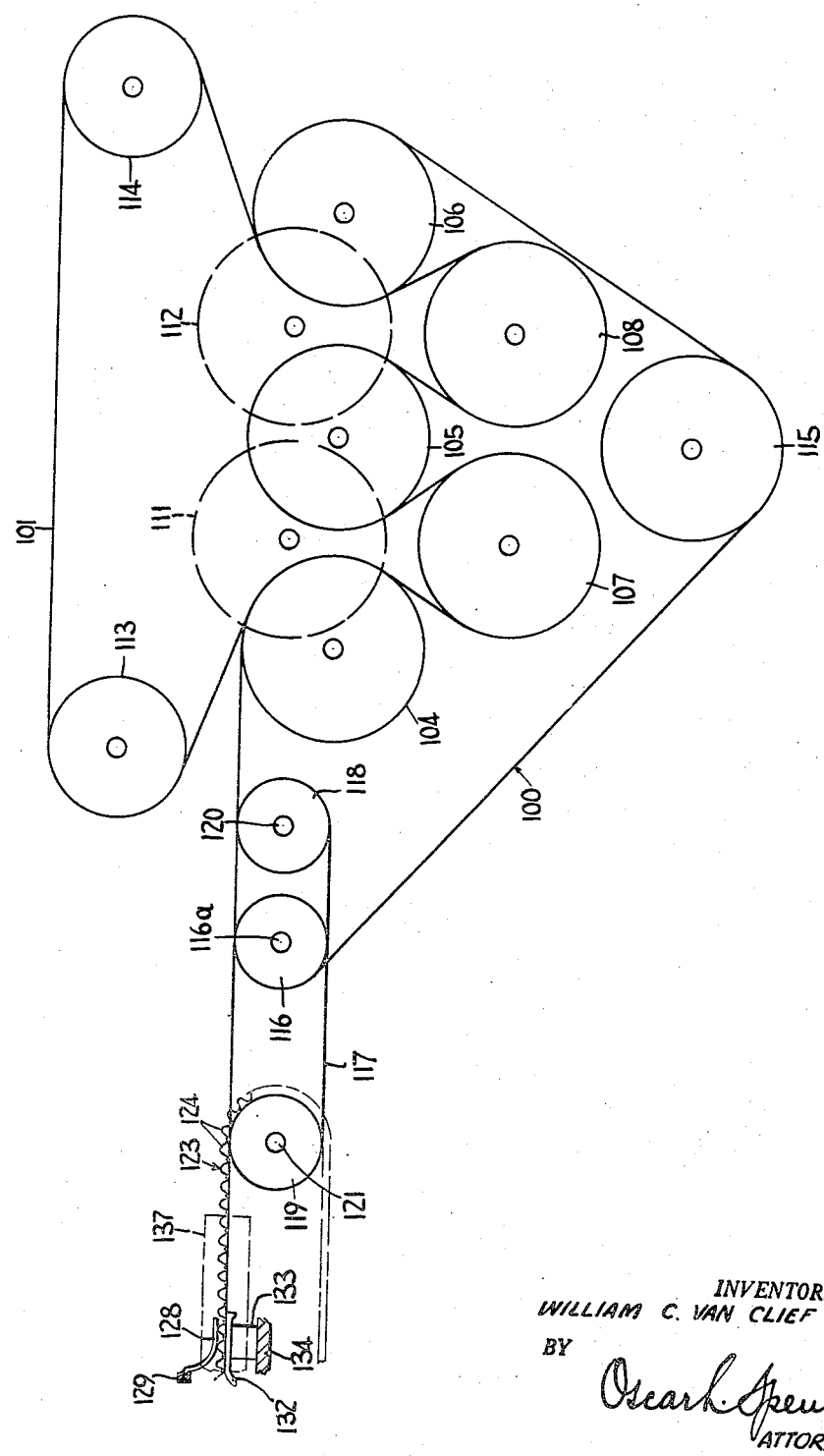

Oct. 7, 1958  W. C. VAN CLIEF, JR  2,854,797
APPARATUS FOR SANDING THE TIPS OF BRUSH BRISTLES
Filed May 13, 1955  6 Sheets-Sheet 5
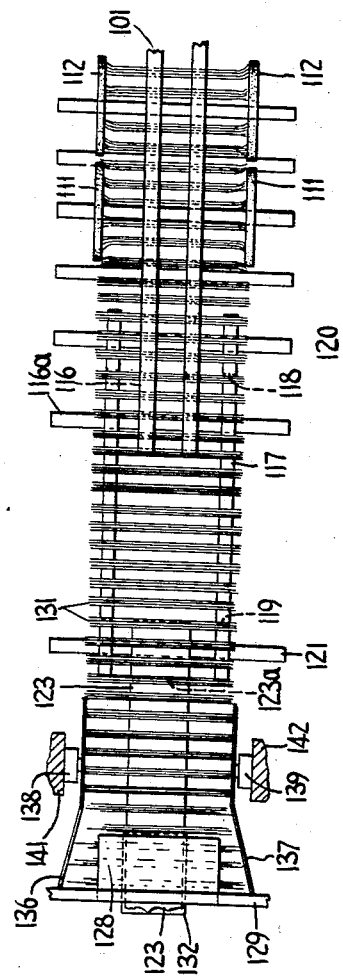
FIG. 5
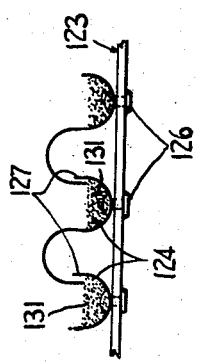
FIG. 6
FIG. 7
INVENTOR.
WILLIAM C. VAN CLIEF JR.
BY Oscar L. Spencer
ATTORNEY Oct. 7, 1958 W. C. VAN CLIEF, JR 2,854,797
APPARATUS FOR SANDING THE TIPS OF BRUSH BRISTLES
Filed May 13, 1955 6 Sheets-Sheet 6

INVENTOR.
WILLIAM C. VAN CLIEF JR
BY
Oscar L. Spencer
ATTORNEY

United States Patent Office 2,854,797
Patented Oct. 7, 1958

2,854,797

APPARATUS FOR SANDING THE TIPS OF BRUSH BRISTLES

William C. Van Clief, Jr., Baltimore, Md., assignor to Pittsburgh Plate Glass Company, a corporation of Pennsylvania Application May 13, 1955, Serial No. 508,059

5 Claims. (Cl. 51—110)

This invention relates to apparatus for pointing and roughening the tip portions of bristles and it has particular relation to such apparatus as applied to the treatment of synthetic bristles employed in the manufacture of brushes.

Synthetic bristles suitable for use in the manufacture of brushes, such as paint brushes and other brushes, have heretofore been prepared by extrusion of a solution of, or a hot melt of, an appropriate plastic such as cellulose acetate, nylon or the like, through spinnerets in order to form filaments of desired denier. The denier of the filaments in some instances has been varied periodically by change in the rate of extrusion of the plastic material or by varying the rate of take-up. In this way, filaments which could be cut into sections of desired bristle length and having taper in some measure corresponding to that of natural pig bristles have been attained. However, obviously by such techniques bristles tapered to a fine point could not be obtained. Moreover, the surfaces of the bristles were comparatively smooth so that the capacity for holding liquids, such as paints, varnishes, and other coating media, was not entirely satisfactory. For purposes of tapering the bristles to a fine point and/or roughening the surfaces thereof, the portions have been subjected to buffing by means of a suitable abrasive device, such as an abrasive wheel, a sander disk or the like. Usually this buffing operation has been performed by manually holding an assembled brush so that the tips were in contact with the abrasive device. Obviously, this operation requires the individual attention of the operator for each unit and therefore the expense involved in time and labor was relatively great. Moreover, the bristles in the center of the brush knot were usually more or less covered up or protected by the outside bristles so that buffing operation was by no means uniform in all portions of the brush.

In accordance with the provisions of the present invention, the tip portions of bristles and notably of synthetic bristles spun from appropriate plastic material are spread transversely as a layer upon a continuously moving, flexible, endless conveyor. An endless, flexible pressing element is also disposed to have a portion pressing the bristles from the opposite side and thus firmly to hold them on the conveyor; and while they are so held the bristles are passed across the faces of sanding discs so that the tips of the bristles are buffed from one direction at the point of beginning of contact and are buffed from the opposite direction at the point of emergence from contact. As a further feature, the portions of the conveyors carrying the bristles are caused to follow a sinuous path so that the opposite faces of the layer of bristles are alternately extended and compressed in the direction of travel; thus even though the bristles are firmly gripped while between the two conveyors, they are subjected to repeated kneading action which assists in shuffling the bristles outwardly or inwardly in the layer, thus assuring that all or most of the bristles are adequately buffed. The kneading or shuffling action, if desired, may be promoted by driving the conveyor and the pressing element at slight differentials of speed. By so kneading and flexing the tip portions of the bristles, they are substantially uniformly buffed on all sides and are brought to relatively sharp tips having roughened surfaces well designed for holding liquids, such as coating materials. The operation is continuous, thereby assuring high production with a minimum of labor involved.

For a better understanding of the principles of the invention, reference may now be had to the accompanying drawings in which like numerals refer to like parts and in which:

Fig. 3 is a diagrammatical view illustrating the manner in which the tips of the bristles are flexed during the buffing operation;

Fig. 4 is a diagrammatical view of a modified form of the apparatus;

Fig. 5 is a diagrammatical plan view of a portion of the apparatus shown in Fig. 4;

Fig. 6 is a fragmentary detail view of a portion of an orienting conveyor as disclosed in Figs. 4 and 5;

Fig. 7 is a diagrammatical view of a modification of the apparatus, adapted for use in sanding the tips of single lengths of brush bristles;

Fig. 10 is a view of section of brush bristle stock showing two oppositely projecting tapered tip portions; and Fig. 11 is a view of a section of stock in which two single lengths of bristles are connected at their tips.

Synthetic filaments adapted to be cut to form bristles are spun from a hot melt or a solution of a plastic in well known manner. They may be of uniform diameter, being adapted to be cut to lengths and then sanded to provide pointed tips. However, it is usually desirable to spin them with periodic variations of denier providing nodes and antinodes spaced so that the distance between each pair of antinodes will correspond to the length of a double ended bristle while the space between node and antinode corresponds to single bristle length. By cutting rovings of such filaments at sections corresponding to the antinodes double ended bristles are formed; by cutting them at both nodes and antinodes, single bristles useful in conventional hand type brushes are formed. Either of these types of bristles may be pointed by use of the apparatus herein disclosed. Double lengths of brush bristle stock are illustrated in Figs. 10 and 11 of the drawings at S and S¹ respectively. In Fig. 10, the stock is cut at the antinodes. The two ends of such section may be sanded to points and subsequently the section may be cut in the middle (for instance my means of hand shears) to provide two lengths of single bristle. However, if desired, the double ended bristle sections may be replicately bent about cores in channels, in well known manner, to provide channel strips. It is also contemplated to cut out portions of the nodal zone, as indicated at X—X, and then to sand the tip portions in the manner hereinafter to be described. In like manner, sections may be cut out as at Y—Y in Fig. 11 and the tips may be sanded by use of double faced discs in a manner which will also be more fully illustrated. The bristle may be round or trefoil or of any other appropriate section either at their tips or throughout their lengths. The bristle material, the tips of which are to be sanded, is appropriately spread in layers upon a conveyor system to be described, for purposes of having their tips pointed.

Figure 1:
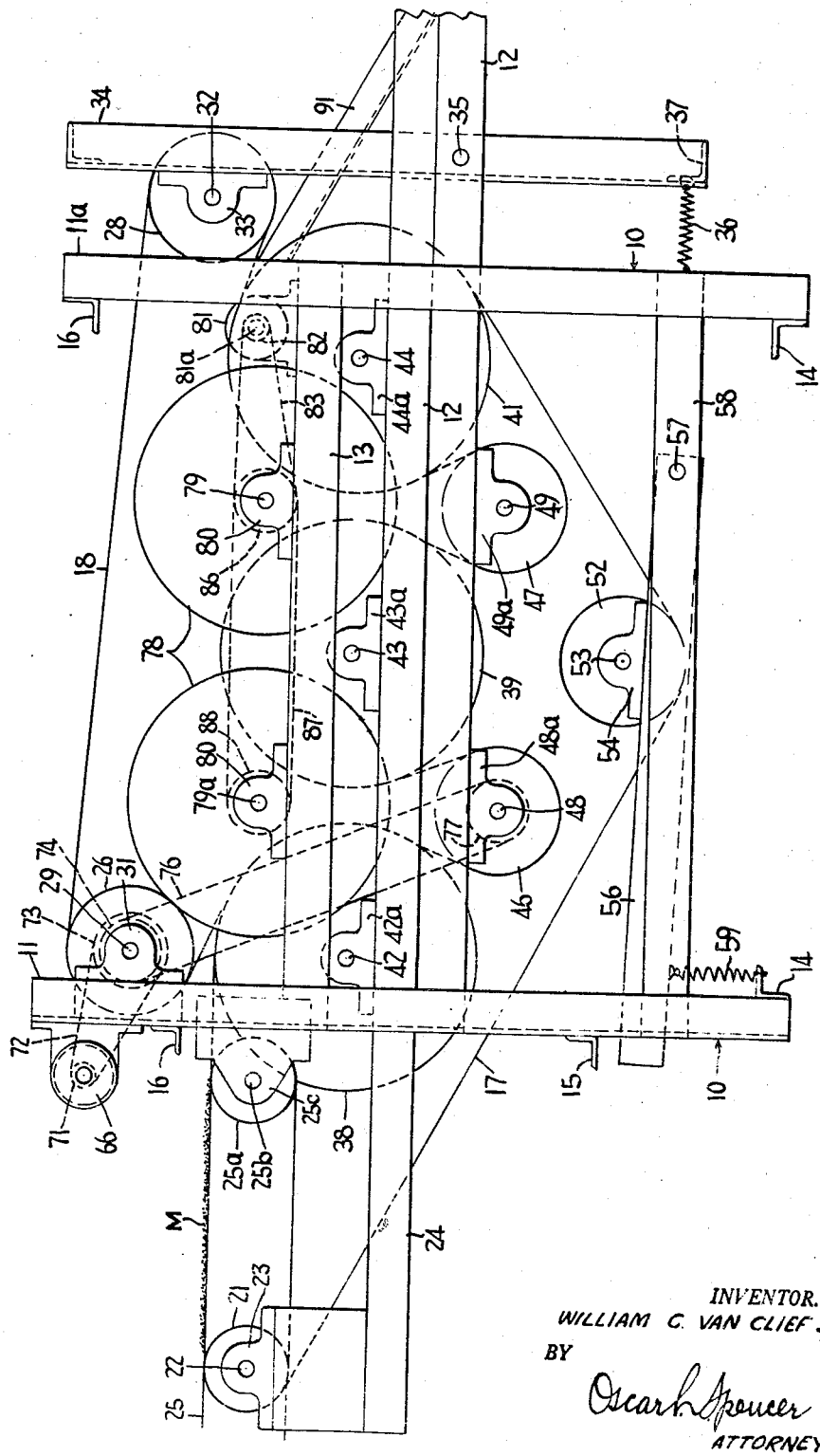
Fig. 1 is a side elevational view of the apparatus showing for purposes of clarity certain of the parts broken away in order to expose the operations of essential mechanisms.
Figure 2:
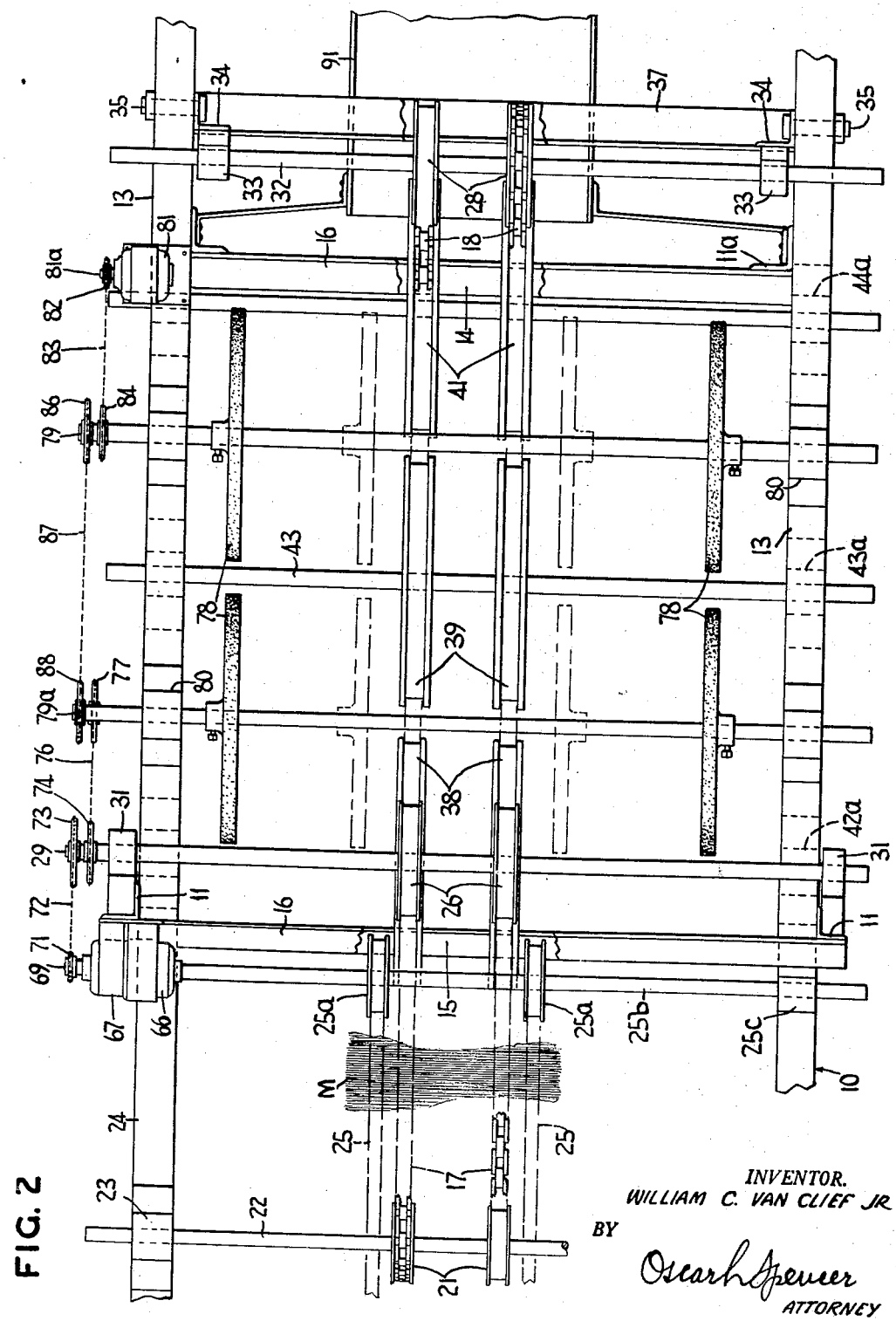
Fig. 2 is a plan view of the apparatus.

In Figs. 1 through 3 is illustrated an embodiment of apparatus adapted for use in the simultaneous sanding of outwardly tapered tip portions of portions of stock formed by cutting fibers or rovings through the antinodes to provide double ended bristles.

As subsequently to be described in connection with additional embodiments of the invention, the carrier conveyors and the pressing or backing conveyors could be spaced to grip material of single bristle length. A single pair of such elements working together could also be employed, or if the elements were employed in transversely spaced pairs, one set of elements could be employed for each line of stock. Two lines of stock, as for instance single lengths of bristles, may thus be treated simultaneously.

The apparatus as shown in Figs. 1 through 3 comprises a framework 10, which is static in its operation and for purposes of clarity, in Fig. 1, is indicated as being broken away. The framework includes uprights 11 and 11a with vertically spaced longitudinal bars 12 and 13 interconnecting the same. Transversely, the uprights are interconnected by bars 14, 15 and 16.

Means to hold and to carry synthetic bristles during the buffing operation comprises a flexible, endless carrier which is shown as comprising a pair of longitudinally spaced receiving or carrying elements such as belts, cables, wires, or chains 17 and a set of backing, pressing or holding elements 18 disposed to run in common planes. These elements, as shown in Fig. 2, are arranged in pairs so transversely spaced that the bristle material M (preferably of double end type) disposed transversely thereupon, is firmly held between juxtaposed flights or reaches of the carrying elements at spaced intermediate points, but the end portions project substantially to expose them for buffing operations. The rear ends of the conveyor elements 17 are trained about suitable pulleys or sprockets 21 upon a transverse shaft 22 journaled in bearings 23 upon a rearwardly extending portion 24 of the frame 10.

Receiving or transfer conveyors 25, also flexible and being synchronized with conveyors 17 are provided. They run upon sprockets or pulleys 25a upon a shaft 25b, which in turn, rotates in bearings 25c upon uprights 11. A substantial overlap of conveyors 17 and 25 for transfer of the brush material from one system to the other is thus provided.

The pressing or backing element 18 is also trained about pulleys or sprockets 26 and 28, the former of which is disposed upon transverse shaft 29 journaled in bearings 31 upon the upright 11. The pulleys or sprockets 28 are fixed upon a rotary shaft 32 in bearings 33 upon uprights 34 which preferably are pivoted at intermediate points 35 upon the ends of longtudinal bars 12. Bars or uprights 34 are actuated continuously to tension conveyor 18 by a spring 36 which at one end is attached to connecting bars 37 between the lower ends of uprights 34 and the other end is attached to an appropriate portion of the framework 10.

The upper reaches of conveyors 17 and the lower reaches of the backing conveyors 18 are trained in a series of loops, or festoons, three of which are indicated as A, B and C, but obviously may be extended to any convenient number. Loops A, B and C are formed in the conveyor chains by three spaced pairs of upper sprocket gears 38, 39 and 41 keyed respectively on parallel shafts 42, 43 and 44, journaled in bearings 42a, 43a and 44a upon the upper faces of the longitudinal bars 12. The lower portions of the loops A, B and C are formed by pairs of sprockets 46 and 47, downwardly spaced from the sprockets 38, 39 and 41 upon shafts 48 and 49 which in turn are journaled in bearings 48a and 49a upon the lower faces of the longitudinal bar 12. It will be noted that shafts 48 and 49 are in vertical transverse planes approximately midway between shafts 42—43 and 43—44.

For purposes of maintaining tension on the receiving or carrying chains 17, take-up idlers 52 are provided and are carried upon a transverse shaft 53 in bearings 54. The latter, in turn, are supported for approximately vertical movement upon longtudinal bars 56 which at one end are pivoted upon a shaft 57 transversely disposed between a pair of longitudinally extending connecting bars 58 upon the lower ends of uprights 11. Means to urge the bars 56 downwardly about their pivots comprises tension springs 59, each of which at one end, is attached to a bar 56 and at the other end, is attached to an appropriate portion of the framework 10.

It will be apparent that the faces of the upper portions of conveyor elements 17 and lower portions of elements 18, in their passage over the several sprocket gears 38, 39, 41, 46 and 47, are superposed upon each other and by reason of the tension exerted by idlers 28 and 52, they are pressed toward each other with considerable force thus firmly gripping bristle stock material between them.

Mechanism to drive conveyor elements 17 and 18 in synchronism or if preferred, with slight differentials of speed with respect to each other, comprises a motor 66 shown as being mounted upon one upright 11 and having a speed reducing mechanism indicated at 67, with a drive shaft 69 having a pulley or sprocket 71 about which is trained sprocket chain, V-belt or other flexible driving connection 72 which in turn is trained about a pulley 73 keyed upon the shaft 29 to drive the backing element 18. Conveyor 17 is driven by the same motor by means of a pulley 74 also keyed upon shaft 29 and having a flexible connection such as a V-belt or sprocket chain 76 trained thereabout and being further trained about a pulley 77 upon shaft 48 so that the two conveyor elements 17 and 18 are concurrently driven. The sizes of pulleys 73 and 77 should be so selected that pulleys or sprockets 26 and 38 are rotated at such speed as to drive the two conveyors 17 and 18 at the same, or at an appropriate differential of speed.

The spaced pairs of conveyor elements may be replaced by three or more pairs of elements running in parallelism to each other. The spaced flexible conveyors may be replaced by single flat belts or chains of a width to replace the spaced parallel conveyors. It will be apparent that the upper conveyor may be of one type while the lower is of another.

Sanding or buffing devices for the tips of the bristles may comprise sanding discs 78 which run in planes parallel to the planes of the conveyors and in position to contact with and to flex the projecting tips of the bristles in the layer between the conveyors. Two of these are transversely spaced on each of transverse shafts 79 and 79a which are journaled in bearings 80 on the upper faces of longitudinal bars 13. The shafts 79 and 79a are parallel and the faces of the discs 78 are axially spaced from the loops A, B and C in the conveyor so that the tips of the bristles contact therewith. A plurality of pairs of discs (in this instance 2 pairs) are provided and their shafts (79 and 79a) are disposed in vertical transverse planes approximately midway between the shafts 42–43 and 43–44.

Manifestly, the sanding discs should be rotated at relatively high speeds as compared to the rate of travel of the conveyors 17 and 18. Various mechanisms may be employed to attain this result, but probably the most simple comprises an independent motor, such as the motor 81, which is mounted upon a suitable support, such as the upper face of a longitudinal bar 13. This motor has a drive shaft 81a upon which is mounted a pulley 82, having a V-belt or other flexible driving member 83 trained thereabout and providing a driving connection for a pulley 84 upon the shaft 79 of one of the pairs of sander discs. A driving connection between shafts 79 and 79a is provided by a second pulley 86 upon shaft 79 and having a V-belt or other flexible driving connection 87 trained thereabouts and further being trained about a corresponding pulley 88 on the shaft 79a.

In the operation of the foregoing apparatus to buff or sand the tip portions of bristles such as a double ended synthetic bristle stock, the stock is spread as uniformly as practicable as a layer M upon the top of the receiving or transfer conveyor system 25. Loading may be performed manually or by mechanical means as may be desired. During the operation of loading, it will be appreciated that the system comprising the elements 17 and 18 are kept in continuous movement and such movement is continued throughout the sanding operation. Likewise, the motor 81 is operated continuously to drive the sanding discs at high speed. The layer of bristle materials is carried forward upon receiving or transfer conveyors 25, is deposited upon conveyors 17, and then is pressed between them and conveyors 18. It is then carried forward in an arcuate path across the face of the first of the sanding discs, which is rapidly rotated thus causing plastic material to be abraded from the tips of the bristles and from the side portions of the bristles contiguous to the tips. As the tips of the bristles traverse the face of the disc they approach the axis of the latter. Assuming the radius of the disc is $r$, the point of initial contact, as shown in Fig. 3, will be at a distance $r$ from the axis, as the tips reach the point of closest approach to the axis the space between the two will be $r_1$. When the tips leave the disc the space between the point of departure and the axis will again be $r$.

The points of initial contact and final contact of the bristles with a disc should be relatively widely spaced. In those portions of the path of travel where the tips of the bristles initially contact the sanding discs as at V, it will be observed that the tips are flexed substantially downwardly owing to the rotary motion of the disc. In this zone, the abrasion is primarily upon one side of the tip portions.

As the bristles are carried across the face of the sanding disc by the conveyors 17 and 18, the direction of motion of the discs with respect to the path of travel of the chains is gradually reversed until the tips of the bristles gradually are deflected as indicated at W in such manner that the opposite sides of the bristles are being buffed. Naturally, during the transition from zones V to W the bristles are buffed at varying angles thus assuring that the sections of the bristles contiguous to the tips are well rounded and that all portions of the tips are adequately roughened by the abrading action.

It will be apparent that the bristles travel downward from the disc 78 to and about the sprockets 46 returning upwardly upon the opposite side of the shaft 79 from that of the pulley 38. During this upward movement, the bristles are again flexed by the revolving disc 78 at the point of initial contact and then the direction of flexing is gradually reversed as the bristles progress upwardly until they are flexed oppositely at the point where they leave contact with the buffing or sanding disc. The bristles are thus again flexed twice in each contact with a disc so that each disc in effect produces four flexures of the tips of the bristles. The bristles between the conveyors 17 and 18 passing upwardly around the sprocket 39 are brought into contact with the second of the sanding discs, the flexures being repeated in the manner already described and the bristles traversing the sanding disc twice. It will be appreciated that these operations are repeated at the opposite ends of the bristles.

During the passage of the conveyors 17 and 18 about the sprockets or pulleys 38, 46, 39, 47 and 41, it is to be observed that the layer M of bristles is subjected to repeated flexures in a direction substantially perpendicular to shafts 48 and 49, first to one side and then to the other. Therefore, each face is subjected alternately to compression and extension. This produces the kneading and shuffling action already referred to, which assists in bringing all or a major portion of the bristles into contact with the sanding discs. If desired, this mixing action can be increased by driving chains 17 and 18 at slight differentials of speed.

Ultimately the conveyors carry the bristles over the pulleys or sprockets 41 and they pass from between the chains and are deposited upon a suitable conveyor system such as a chute indicated at 91 where they may be picked up manually and deposited upon a table or in a suitable container. They may also be allowed to slide down the chute into a suitable receptacle, if so desired.

The bristles may be used as double ended bristles for doubling about a core in a channel or groove. They may also be cut medianly so that each double bristle forms two independent bristles. These can be set in ferrules with cement to form conventional brushes.

A further embodiment of apparatus, similar to that described in connection with the preceding figures, but comprising added means for orienting and arranging any bristles which may be misaligned or otherwise out of proper relationship with respect to the main mass of bristles in the row, is illustrated in Figs. 4 and 5. This apparatus comprises a system of flexible conveyor elements 100, such as chains and matching presser, or backing elements 101, corresponding to the elements 17 and 18 in Figs. 1, 2 and 3.

The upper reaches of chains or conveyors 100 and the lower reaches of the chains 101 are appropriately festooned about a system of sprockets 104, 105, 106, 107 and 108 corresponding to the pulleys or sprockets 38, 39, 41, 46 and 47 which provide festoons or loops designed to carry bristle materials in a sinuous path back and forth across the faces of sanding discs 111 and 112 which are duplicated upon each side of the system so that two ends of the bristle material can be tipped or sanded simultaneously. The upper reaches of the presser or backing conveyors 101 are trained about sprockets or pulleys 113 and 114, one of which functions as a take-up roller. A pair of idler rollers or sprockets 115 also function as take-up means for the conveyors 100. Portions of the flexible conveyors 100 also extend about sprockets 116 upon a shaft 116a to provide a receiving apron for the bristle material.

Receiving and transfer conveyors 117, functioning to receive the layers of bristles which are to be tipped and to feed the same uniformly to the carrier conveyors 100 are mounted upon sprockets or pulleys 118 and 119 which are both mounted upon shafts 120 and 121, one of which preferable is driven at such speed as to synchronize the movement of the conveyor 117 with the corresponding movement of the conveyor 100.

Means for orienting and arranging the bristle material before it is delivered to the receiving conveyors 117, comprises a single conveyor 123 which may be a belt trained about a pulley 123a mounted upon the shaft 121 and which may be positively keyed to the latter to obtain synchronous drive between the conveyor 123 and the conveyor 117. The orienting and arranging conveyor 123 may be fed by disposing bunches of bristle stock manually upon the surface thereof, or it may receive material continuously and automatically from a further conveyor (not shown) which is manually fed or which may receive the same directly from an appropriate machine (not shown) for cutting rovings of bristles into proper lengths. The means for orienting the bristles upon the conveyor 123 comprises a series of trough-like transverse bars 124 which preferably cover the entire perimeter of the conveyor and, as shown in Fig. 6 of the drawings, are approximately of S cross-section. One loop of each S is secured upon the belt by means, such as rivets 126 or by other suitable fastening device. The other loop of the S, as indicated at 127, is hooked over the upwardly projecting edge of the secured loop of the adjacent bar, thus permitting the conveyor element 123 to be flexed in its passage about the pulley or sprocket 123a.

Bristle material, in falling into the depressions provided by the upwardly facing loops of the bars, tends naturally to be oriented. For purposes of assisting in the arrangement of the bristles in the depressions, a rubber flap 128 may be provided upon a transverse bar 129 and is so positioned as gently to rake over the surface of the conveyor as the latter moves forward, thus orienting any bristle material which may be disposed askew with respect to the corrugations provided by the bars. As many flaps 128 may be provided as may be desired, though, for purposes of illustration, but one is shown.

Further means to assist in orienting the bristle material and to compact the same in appropriate bunches 131 between the corrugations provided by the bars 124 comprises a shoe 132 over which the conveyor 123 is adapted to slide. This shoe may be disposed out of the path of travel of the rivets 126 or if preferred it may be disposed to be engaged by the latter, thus producing a shaking or vibratory motion of the conveyor which assists in compacting and arranging the bristles. If desired, the shoe 132 may be supported by an appropriate vibrator, such as an electrical vibrator 133, in turn, supported by any convenient means, such as a bar 134.

Means to even up the ends of the bristle material in the bunches upon the orienting conveyor 123 is illustrated as comprising a pair of vertically disposed side plates 136 and 137 indicated in phantom in Fig. 4, and having portions which are outwardly flared so as to engage the ends of any projecting bristles and to push them axially inwardly into alignment with the main mass of material. If desired, the plates 136 and 137 may also be vibrated, as for example by means of electrical vibrators 138 and 139, supported upon suitable bars or other devices 141 and 142. The vibration of the plates 136, assisted by that of the shoe 132 will bring all, or most of the bristles which may be accidentally misoriented or which may be longitudinally displaced with respect to the other bristles into their proper position for subsequent sanding operations.

It has already been indicated that the principles of the apparatus, as herein disclosed, are not limited to use in the sanding of the tips of double ended bristles but that they are also susceptible of use in the sanding of single ended bristles, such as may be employed in the construction of conventional paint brushes or other brushes usually of the type employed in manual brushing operations. Apparatus suitable for performing sanding operations upon the tips of single ended bristles, is illustrated in Figs. 7, 8 and 9.

The diagrammatical side view of apparatus, as shown in Fig. 7, is designed to apply particularly to the form of the invention in which the tip portions of the bristles in one row are contiguous to the tips of the bristles in the other row. However, the view essentially corresponds to that in which the tips of one row are pointed away from those in the adjacent row, as shown in Fig. 9. The single side view, as in Fig. 7, is considered adequately to illustrate both embodiments of the invention as shown in Figs. 8 and 9.

The apparatus for performing the sanding includes conveyors 145 of the endless type, such as chains or belts, together with corresponding hold-down backings which are also endless and are indicated at 146. The upper reach of the conveyor 145 and the lower reach of the hold-down conveyor 146 are festooned in the previously described manner about sprockets or pulleys indicated at 147, 148, 149, 149a, 150 and 151. The conveyors are also forwardly trained about sprockets 152, 153 and 154 which are respectively journaled upon driven shafts 155, 156 and 157.

Figure 8:
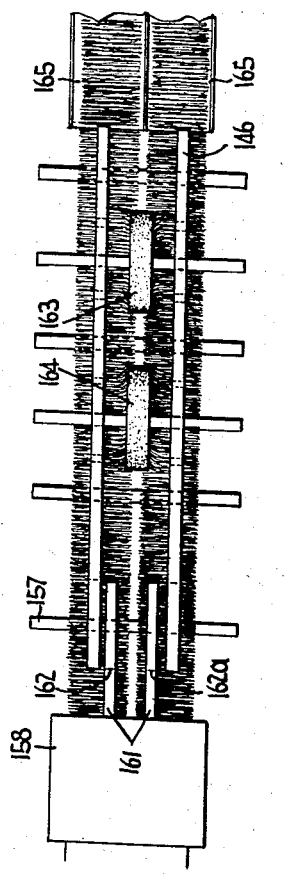
Fig. 8 is a diagrammatical view showing in plan the simultaneous sanding of inwardly projecting tip portions of two rows of single length brush bristle stock, the butts of the bristles in the two rows being spaced.
Figure 9:
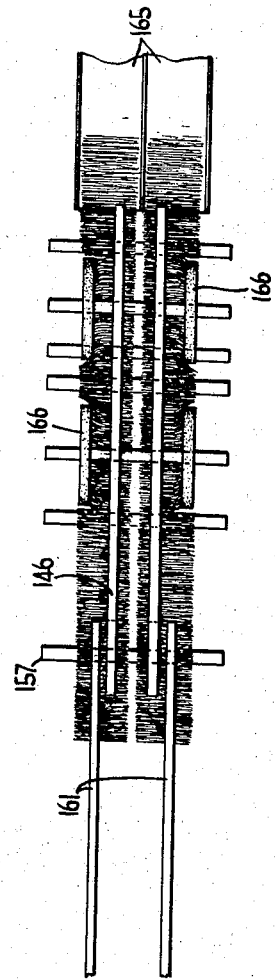
Fig. 9 is a similar view but showing the sanding of the tips of bristles in two rows simultaneously, where the tips of the two rows project away from each other.

As shown in Fig. 8, the apparatus of Fig. 7 is designed for simultaneously sanding the tips of double ended bristles where they are arranged in parallel rows with the tips to be sanded pointed toward each other, but preferably being in slightly spaced relationship with respect to each other. Rows of bristles, having their tips so positioned, may be formed for example from sections such as are illustrated in Fig. 11 of the drawings where the cutting is performed to sever through the nodal portions of the bristles to provide two single length sections which are joined at their tips. In the cutting operation, two cuts are performed, as indicated at Y, removing a small section R, thus leaving the tip portions pointed toward each other but being slightly spaced. Apparatus for performing such cutting operation is indicated diagrammatically at 158 in Fig. 8. Two rows of transversely disposed bristles of single length are thus fed forwardly. The bristles may be carried between a lower receiver conveyor 159 and an upper backing conveyor 161 which act to press the short lengths of bristle material upon the lower conveyor and maintain them in proper relationship during the conveying operation. The conveyors 159 and 161 are trained about pulleys or sprockets 162 and 162a upon the shaft 157 so that the conveyors travel in synchronism with the conveyor 145 and the presser element 146 of the sanding apparatus. The bristle material is thus positively fed forward between the juxtaposed flights of the conveyor 145 and the hold-down 146 without possibility of substantial derangement of the short length sections of bristle material. Means to sand the tips of the bristles in the two rows, as illustrated in Fig. 8, comprises a pair of sanding wheels of discs 163 and 164 which are double faced and which are so disposed between the two rows of bristles as to contact the tips of bristles in both rows concurrently. The bristle material, after it is sanded, is discharged down chutes 165.

In Fig. 9 is illustrated an arrangement of apparatus which may be employed to sand the tips of single length bristles arranged in two rows with the tip portions thereof projecting in opposite outward directions. Bristles of this character may be formed by cutting double ended sections which are formed by cutting rovings of bristle material through the nodal portions while leaving the midportions uncut. In cutting the double length sections to single lengths, cuts are made at the points X in Fig. 10 thus removing small sections $R_1$ of the nodal or thickened portions of the bristles. The material is thus arranged upon emergence from the cutting apparatus in two parallel rows in which the butt portions are in contiguity with respect to each other. The rows of bristle material are fed forwardly to the sanding apparatus by means of upper and lower conveyors corresponding to or substantially identical with the conveyors 159 and 161 disclosed in Fig. 7. These conveyors may be disposed between or outside of the conveyors 145 and the backing conveyors 146 of Fig. 7, though perhaps for purposes of attaining maximum freedom of the bristle tip portions for the sanding operations, it is desirable to dispose the receiving conveyors outside of the conveyors 145 and backing conveyors 146, so that when the transfer of the material from one conveyor system to the other is made, the material during the sanding operation, will be grasped relatively close to the butt portions. The sanding discs 166, indicated in this drawing, are single faced and essentially correspond, in their operation, to the discs 78 already described.

The types of apparatus, as disclosed in Figs. 7, 8 and 9, for sanding the tips of single length bristles are often desirable where the material is to be used in preparing brushes embodying single length bristles having the butt portions thereof set in an appropriate cement. This is true because the operator, in arranging the bristle material in knots or bunches prior to the cementing operation, can readily even up the butt potrions of a bunch of material merely by tapping or knocking said portions against a flat surface. This is a common operation in the construction of a brush.

It will be apparent to those skilled in the art that the embodiments of the invention as illustrated in the drawings are exemplary. Numerous modifications may be made therein without departure from the spirit of the invention or the scope of the appended claims.

I claim:

1. Apparatus for buffing the tips of brush bristle stock to point said tips and to roughen portions of the sides of the bristles contiguous to the tips, said apparatus comprising a pair of endless, flexible, travelling conveyors having the faces of reaches thereof juxtaposed to carry and to grip a layer of brush bristles therebetween with the ends of the bristles free to flex, rotary wheel elements disposed upon parallel axes, the elements being common to both conveyors, said reaches being trained about the elements to form a loop in each conveyor, the sides of the loop in one conveyor being disposed within and parallel to the sides of the loop, in the other, the layer of bristles in travelling through the loops, being flexed back and forth in a direction substantially perpendicular to said axes whereby to produce a kneading action and thus to shuffle the bristles in the layer and a rotary sander disc, the axis of which is parallel to the axes of the wheel elements, the face of the disc being axially spaced from the loops in the conveyors and being in position to contact the tips of the bristles whereby to buff the tips and the contiguous side portions of the bristles.

2. Apparatus for buffing the tips and the side portions of brush bristles contiguous to the tips, comprising a rotary sander disc and a pair of endless, flexible, conveyors, said conveyors each having a reach, a face of which is juxtaposed to a face of a reach of the other, whereby to grip and to carry a layer of bristles between the reaches with the ends of the bristles free to flex, the reaches being trained concentrically about a series of wheel elements having parallel axes and being common to the two conveyors, said wheel elements forming at least one loop in each of the conveyors, the sides of the loop in one conveyor being disposed within and parallel to the sides of the loop in the other, the face of the disc being axially spaced from the loops whereby the tips of bristles between the conveyors are brought into contact therewith, the loops passing twice across the face of the sander disc in paths in which the tips of the bristles first contact the face of the disc at an edge thereof, move across the disc, approach the axis thereof and pass away from the edge of the disc at a point spaced from the point of first contact, whereby the ends of the bristles, in their passage across the face of the disc, are repeatedly flexed from side to side to effect buffing of the tips of the bristles from different angles.

3. Apparatus for buffing the tips and the side portions contiguous to the tips of brush bristles, comprising a rotary sanding disc and a pair of endless, flexible, conveyors, a reach of each conveyor being juxtaposed to a face of a reach of the other, whereby to grip and to carry a layer of bristles between the reaches, the reaches being trained about a series of wheel elements having parallel axes, said wheel elements forming at least one loop in each conveyor, the sides of the loop in one conveyor being parallel to those in the other to grip a layer of bristles therebetween, the layer of bristles in passing between the two loops being subjected to flexure in a direction substantially perpendicular to the axes of the wheel element, whereby to shuffle the bristles in the layer, the sides of the loops in said conveyors being passed twice across the face of the sander disc, the sander disc being axially spaced from the loops, whereby the tips of the bristles move in paths in which the tips of the bristles first contact the face of the disc at an edge thereof, move across the disc approaching the axis thereof and pass away from the edge of the disc at a point spaced from the first point, whereby the tips of the bristles, in their passage across the face of the disc, are repeatedly flexed from side to side to effect buffing from different angles.

4. Apparatus for buffing the tips and sides of brush bristles comprising a rotary sander disc and a pair of flexible, endless conveyors said conveyors each having a reach, a face of which is juxtaposed to a face of a reach of the other of said conveyors, whereby to grip and to carry a layer of bristles between the reaches, the reaches being trained concentrically about a series of longitudinally-spaced wheel elements having parallel axes, the wheel elements being common to the two conveyors, said axes also being parallel to the axis of the sander disc, said wheel elements forming at least one loop in each of the conveyors, the sides of the loop in one conveyor being disposed within and parallel to the sides of the loop in the other, the face of the sander disc being axially spaced from the loops whereby the tips of the bristles pass twice across the face of the sander disc in paths in which the tips of the bristles first contact the face of the sander disc at an edge thereof, move across the disc, approach the axis thereof and pass away from the edge of the disc at a point space from the point of first contact, the tips of the bristles in their passage across the face of the disc being repeatedly flexed from side to side to effect buffing thereof from different angles, and a single, endless conveyor disposed in position to feed bristles in a layer between the first mentioned conveyors and convergent side plates disposed upon opposite sides of the single conveyor in position to even the ends of the bristles in the layer of bristles disposed transversely of the single conveyor.

5. Apparatus for buffing the tips of brush bristle stock whereby to point the tips and also to roughen portions of the sides contiguous to the tips, said apparatus comprising a pair of flexible, endless travelling conveyors having faces of reaches thereof juxtaposed to carry and to grip a layer brush bristles therebetween with the ends of the bristles free to flex, rotary wheel elements disposed upon parallel axes and being common to both conveyors and about which the reaches are trained to form a loop in each conveyor, the sides of the loop in one conveyor being disposed within and parallel to the sides of the loop of the other, the layer of bristles in travelling between the loops, being flexed back and forth substantially perpendicularly to said axes to produce a kneading action upon the layer whereby to shuffle the bristles in the layer, a rotary sander disc being disposed with the axis thereof parallel to the axes of the wheel elements, the face of the disc being axially spaced from the loops in the conveyors in position to contact the tips of the bristles with the face of the disc whereby to buff the tips and portions of the sides of the bristles contiguous to the tips, a further single conveyor disposed in position to feed a layer of bristle material between said reaches of the first mentioned conveyors, the single conveyor having plates disposed upon opposite sides thereof and being convergent to even the ends of a layer of bristles upon the single conveyor, the single conveyor further being provided with a series of trough elements upon its upper surface, the elements being disposed transversely of the single conveyor and a rake disposed to stroke bristles disposed askew across the trough element whereby to bring them into parallelism and thus to allow them to drop into the trough elements.

References Cited in the file of this patent

UNITED STATES PATENTS

| | | |
|---|---|---|
| 765,103 | Scott | July 12, 1904 |
| 844,816 | Lee | Feb. 19, 1907 |
| 2,038,150 | Weber | Apr. 21, 1936 |
| 2,635,399 | West | Apr. 21, 1953 |
| 2,700,259 | Dreyfus | Jan. 25, 1955 |